No. 780,611. PATENTED JAN. 24, 1905.
G. & F. MASTERMAN.
COTTON CLEANER.
APPLICATION FILED APR. 25, 1904.
2 SHEETS—SHEET 1.
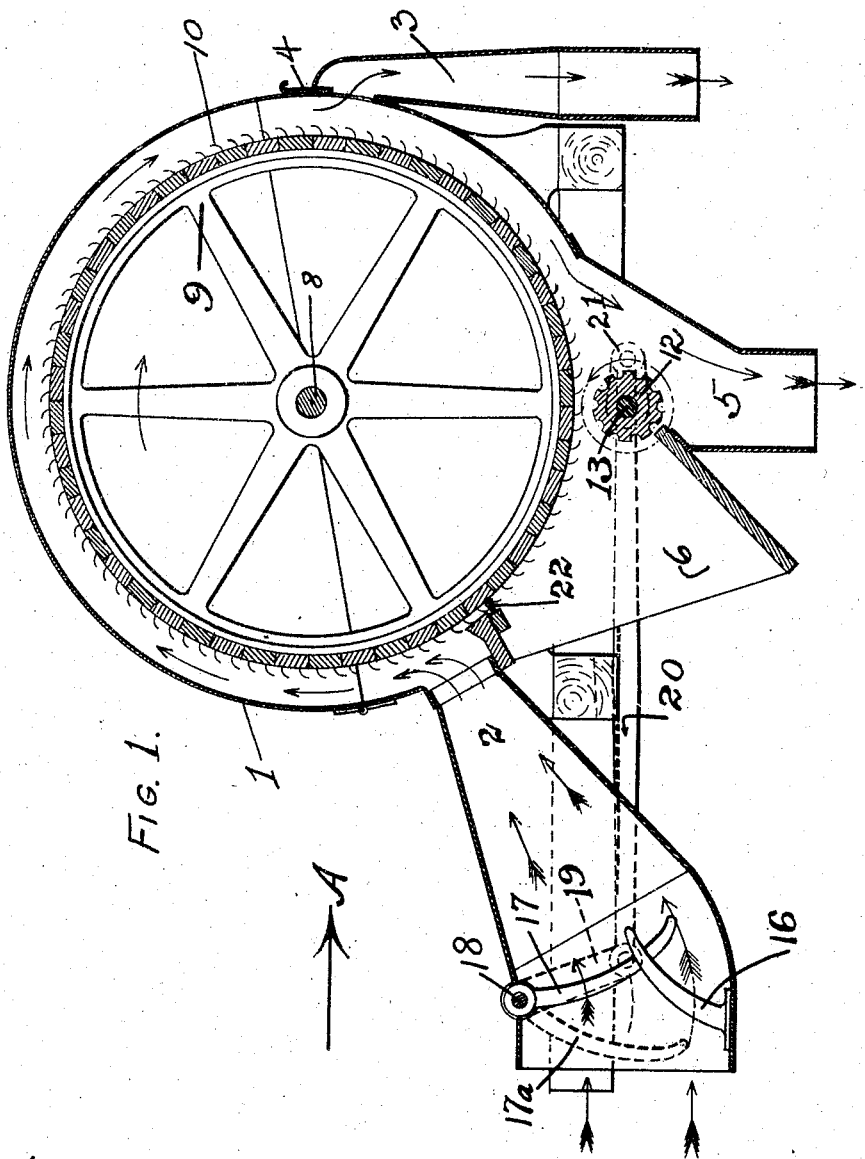
WITNESSES
D. M. Lynch
H. G. Ferree
INVENTORS
George Masterman
Fred Masterman
by J. H. Weatherford
their atty No. 780,611. PATENTED JAN. 24, 1905.
G. & F. MASTERMAN.
COTTON CLEANER.
APPLICATION FILED APR. 25, 1904.
2 SHEETS—SHEET 2.
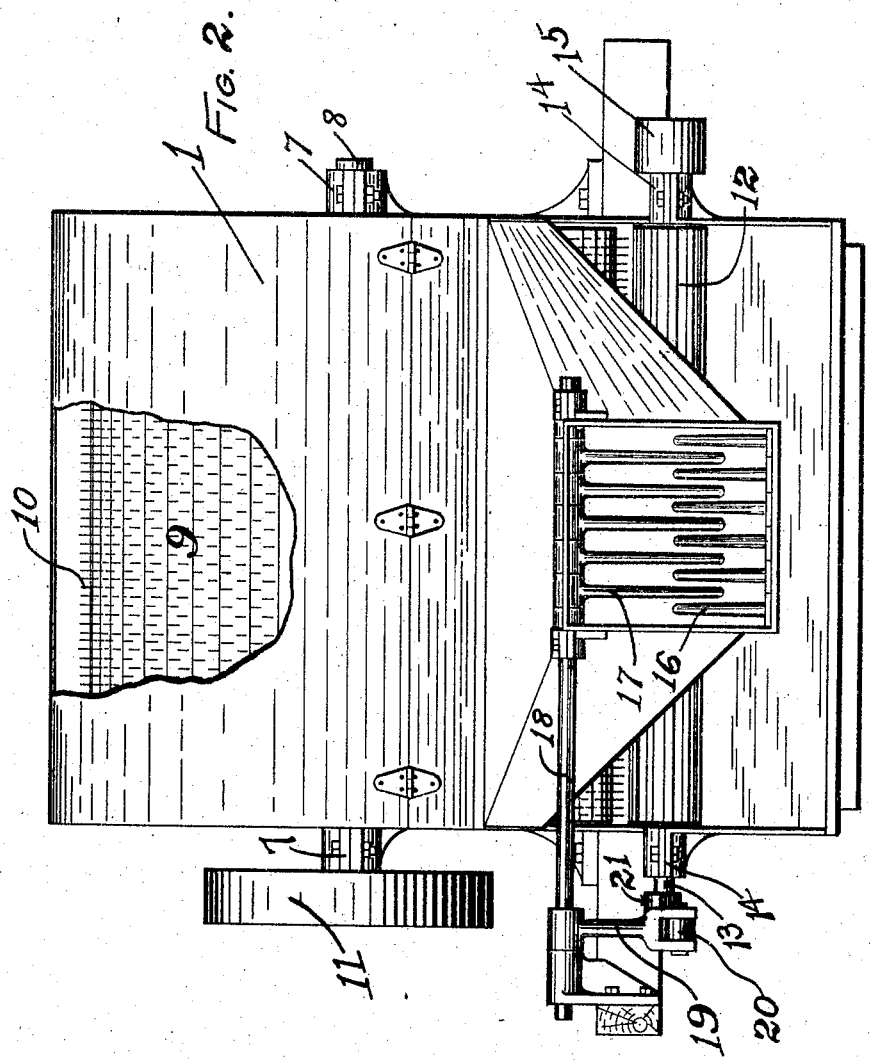
WITNESSES
D. M. Lynch
H. G. Ferree
INVENTORS
George Masterman
Fred Masterman
by J. H. Weatherford
their atty.

No. 780,611.                                          Patented January 24, 1905.

UNITED STATES PATENT OFFICE.

GEORGE MASTERMAN AND FRED MASTERMAN, OF MEMPHIS, TENNESSEE, ASSIGNORS OF ONE-HALF TO HUGH PETTIT AND WILLIAM L. PETTIT, OF MEMPHIS, TENNESSEE.

COTTON-CLEANER.

SPECIFICATION forming part of Letters Patent No. 780,611, dated January 24, 1905.

Application filed April 25, 1904. Serial No. 204,870.

*To all whom it may concern:*

Be it known that we, GEORGE MASTERMAN and FRED MASTERMAN, citizens of the United States, residing at Memphis, Shelby county, State of Tennessee, have invented certain new and useful Improvements in Cotton-Cleaners, of which the following is a specification.

Our invention relates to certain new and useful improvements in cotton-cleaners, and has especial reference to a cleaner in which the hulls and dirt are separated from the cotton by the action of an air-blast blowing in the same direction in which the drum moves, but at a faster speed than that of the drum. We carry out these objects as will be more fully hereinafter set forth in the drawings, specification, and claims.

In the drawings, Figure 1 is a sectional end elevation on the center line. Fig. 2 is a front elevation looking toward the machine in the direction of the arrow.

Referring now to the drawings, in which the parts are indicated by the same or like numerals in all the views, 1 is a cylindrical casing, preferably of sheet metal, provided with an inlet-flue 2, through which the cotton is blown into the machine.

3 is an air and dust outlet flue which is regulated by a sliding door 4 and which permits discharge of a part of the air and dust.

5 is the boll-discharge flue, and 6 the cotton discharge or hopper.

The casing 1 has bearings 7 7 at its ends, which carry a shaft 8, on which is mounted a drum 9 somewhat smaller than the interior of the casing 1. This drum, which extends the full length of the casing, is provided on its periphery with a series of rows of hooks 10 and is driven in the direction shown by the arrow by a pulley 11, mounted on the shaft 8.

12 is a small drum or corrugated roller which is located beneath the drum 9 just clear of the hooks 10 and which is carried by a shaft 13, mounted in bearings 14 and driven by a pulley 15.

16 represents fixed arms, and 17 a set of swinging beater-arms located at the mouth of the inlet-flue 2, the arms 17 being mounted on a rocker-shaft 18 in the upper portion of the said flue, which shaft is rocked by an arm 19, connected by a rod 20 with a crank-arm 21 on the shaft 13 of the roll 12 and being swung by said arm between the position shown and the dotted position $17^a$.

The action of the device is as follows: Cotton is blown with a strong blast through the flue 2. The beaters 17 loosen or tear it up and spread it out in the flue, which widens as it approaches the casing 1 to the full width of said casing and thoroughly distributes the cotton along the entire length of the drum 9. The direction of rotation of the drum will be seen to be the same as that of the air; but the speed is much slower. The cotton is therefore caught by the hooks 10 and retained on them, while the bolls, leaves, and dust are blown around the periphery of the casing. When they reach the flue 3, the dust and part of the blast pass out through the opening, and the balance of same, with the heavy dust and hulls, drops down and out through the flue 5. The cotton is caught by the corrugated roller 12, which is driven at a higher peripheral speed than the drum 9 and is rolled through the space between the drum and roller, forming thus an effective cut-off to prevent the blast passing and carrying the bolls through with the cotton. When the cotton passes the roller 12, it drops of its own weight through the opening 6, such of it as fails to fall off being brushed off by the brush 22.

Having fully described our invention, what we claim, and desire to secure by Letters Patent in the United States, is—

1. A cotton-cleaner, comprising a casing, a drum having hooks thereon revolving in said casing, a cotton-inlet, beaters mounted at the entrance to said inlet, a dust and air outlet oppositely disposed, a boll-outlet and a cotton-outlet arranged substantially as described.

2. A cotton-cleaner comprising a casing, a drum having peripheral hooks thereon, mounted in said casing, an air and cotton inlet flue leading to said casing, fixed and swinging arms mounted at the entrance to said flue, and means for reciprocating said swinging arms, of a dust and air outlet leading from the opposite side of said casing, a boll-outlet, a cotton-outlet, and a roller coacting with said drum between said boll and cotton outlet.

3. A cotton-cleaner comprising a casing, a drum having its face filled with pointed hooks and means for revolving said drum in the direction opposite to that in which the hooks point, and an air and cotton inlet leading into said casing to direct the cotton and air against said drum substantially as and for the purposes set forth.

In testimony whereof we have signed our names to this specification in the presence of two subscribing witnesses.

GEORGE MASTERMAN.
    FRED MASTERMAN.

Witnesses:
 D. M. LYNCH,
 H. G. FERREE.